(12) United States Patent
Yoon et al.

(10) Patent No.: US 8,986,805 B2
(45) Date of Patent: Mar. 24, 2015

(54) VACUUM INSULATION PANEL, REFRIGERATOR WITH VACUUM INSULATION PANEL AND MANUFACTURING METHOD FOR VACUUM INSULATION PANEL

(71) Applicant: LG Electronics Inc., Seoul (KR)

(72) Inventors: Ilseob Yoon, Changwon-Si (KR); Youngbae Kim, Changwon-Si (KR); Jaehyun Soh, Changwon-Si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/853,561

(22) Filed: Mar. 29, 2013

(65) Prior Publication Data

US 2013/0221011 A1    Aug. 29, 2013

Related U.S. Application Data

(63) Continuation of application No. PCT/KR2011/006944, filed on Sep. 20, 2011.

(30) Foreign Application Priority Data

| Oct. 1, 2010 | (KR) | 10-2010-0096121 |
| Oct. 1, 2010 | (KR) | 10-2010-0096122 |
| Nov. 2, 2010 | (KR) | 10-2010-0108373 |
| Nov. 5, 2010 | (KR) | 10-2010-0110042 |

(51) Int. Cl.
*F16L 59/065* (2006.01)
*F25D 23/06* (2006.01)
*B29C 53/04* (2006.01)
*G01K 13/00* (2006.01)
*B29C 53/06* (2006.01)

(52) U.S. Cl.
CPC .............. *F25D 23/06* (2013.01); *F25D 23/062* (2013.01); *B29C 53/04* (2013.01); *G01K 13/00* (2013.01); *B29C 53/06* (2013.01); *F25D 2201/14* (2013.01)
USPC ............................................. 428/69; 312/406

(58) Field of Classification Search
CPC ............................... E04B 1/803; F16L 59/065
USPC ............................................. 428/69; 312/406
See application file for complete search history.

(56) References Cited

U.S. PATENT DOCUMENTS

| 5,843,353 A | 12/1998 | De Vos et al. |
| 6,106,449 A | 8/2000 | Wynne |
| 2003/0157284 A1* | 8/2003 | Tanimoto et al. ............. 428/36.1 |
| 2004/0253406 A1* | 12/2004 | Hayashi et al. ................. 428/69 |

FOREIGN PATENT DOCUMENTS

| JP | 2000-97390 A | 4/2000 |
| JP | 2001-336691 A | 12/2001 |
| JP | 2001-349492 A | 12/2001 |
| JP | 2006-78190 A | 3/2006 |

* cited by examiner

*Primary Examiner* — Alexander Thomas
(74) *Attorney, Agent, or Firm* — Birch, Stewart, Kolasch & Birch, LLP

(57) ABSTRACT

A vacuum insulation panel includes a core material having a bending groove at at least one surface thereof, and an envelope material to cover an outer surface of the core material and an inner surface of the bending groove. Also, a refrigerator with the vacuum insulation panel and a manufacturing method for the vacuum insulation panel are provided.

11 Claims, 6 Drawing Sheets

VACUUM INSULATION PANEL, REFRIGERATOR WITH VACUUM INSULATION PANEL AND MANUFACTURING METHOD FOR VACUUM INSULATION PANEL

CROSS REFERENCE TO RELATED APPLICATIONS

This application is a Continuation of PCT International Application No. PCT/KR2011/006944 filed on Sep. 20, 2011, and claims priority under 35 U.S.C. §119 (a) to Korean Patent Application Nos. 10-2010-0096122 filed on Oct. 1, 2010, 10-2010-0096121 filed on Oct. 1, 2010, 10-2010-0108373 filed on Nov. 2, 2010, and 10-2010-0110042 filed on Nov. 5, 2010, all of which are hereby expressly incorporated by reference into the present application.

TECHNICAL FIELD

The present disclosure relates to a vacuum insulation panel, a refrigerator with the same and a manufacturing method for vacuum insulation panel, and more particularly, a vacuum insulation panel, which is disposed within a cabinet of a refrigerator for enhancement of an insulation performance, and a manufacturing method thereof.

BACKGROUND ART

A vacuum insulation material is a type of high-functional insulation material utilizing the low thermal conductivity of a vacuum by decompressing an inner space into the vacuum state. The vacuum insulation material is typically produced in a form of panel with a predetermined thickness.

The vacuum insulation panel may include an envelope material defining a predetermined inner space, and a core material accommodated within the envelope material to support the envelope material such that the envelope material can maintain the predetermined space.

The envelope material is to maintain a vacuum level (vacuum degree, vacuum rate) inside the vacuum insulation material at a constant level and may be made of a multilayered polymer, an aluminum-laminated film or the like.

The core material is made of a so-called glass fiber, silica or the like. Among others, the glass fiber is widely used by virtue of its excellent initial performance and low material cost. However, it has disadvantages in view of requirements of many equipment and much time for preprocessing and poor durability. The silica exhibits long-term reliability but high material cost.

Meanwhile, the inside the envelope material may be shown having a getter for adsorption of gas present in the inner space of the envelope material. The getter is a type of gas absorbent or moisture absorbent for absorbing gas or moisture which is left in the envelope material or newly introduced therein.

The vacuum insulation material generally has a form of flat panel. Thus, when employed in a refrigerator, many sheets of vacuum insulation panels are attached inside walls of a main body of the refrigerator by considering the shape of the main body of the refrigerator. That is, similar to attaching tiles on outer walls of a building, rectangular vacuum insulation panels are attached inside the main body of the refrigerator.

DISCLOSURE OF INVENTION

Technical Problem

However, a refrigerator is produced in various shapes due to various types of components disposed inside the refrigerator. Accordingly, attaching the vacuum insulation materials in the form of flat panel is very complicated, and a case also exists that it is actually impossible to attach the vacuum insulation panel in a specific portion. Also, heat transfer may occur at a joint portion between the vacuum insulation panels, which may lower the insulation performance of the refrigerator.

In addition, after attaching the vacuum insulation panel inside the wall of the refrigerator, it is actually impossible to determine presence or non-presence of a detect. This results in impossible determination of a defect, which is generated during attachment of the vacuum insulation panels and formation of a foam inside the wall of the refrigerator.

Solution to Problem

Therefore, to obviate those problems, an aspect of the detailed description is to provide a vacuum insulation panel capable of being easily employed in a refrigerator by being produced in various shapes.

Another aspect of the detailed description is to provide a vacuum insulation panel, for which presence or non-presence of a detect can be determined even after completely attached inside a main body of a refrigerator.

To achieve these and other advantages and in accordance with the purpose of the present invention, as embodied and broadly described herein, there is provided a vacuum insulation panel including a core material having a bending groove at at least one surface, and an envelope material to cover an outer surface of the core material and an inner surface of the bending groove.

In accordance with another aspect of this specification, there is provided a method for manufacturing a vacuum insulation panel including forming an envelope material and a core material, respectively, forming a bending groove at at least one surface of the core material, the bending groove having a predetermined depth, injecting the core material into the envelope material and decompressing the inside of the envelope material, and bending the core material such that two surfaces of the bending groove, facing each other, come in contact with each other.

In accordance with another aspect of this specification, there is provided a refrigerator including a refrigerator main body having an outer case externally exposed and an inner case disposed inside the outer case, a foam disposed between the outer case and the inner case, and a vacuum insulation panel fixed to the inner surface of the outer case, wherein the vacuum insulation panel includes a core material having a bending groove at at least one surface, an envelope material to cover an outer surface of the core material and an inner surface of the bending groove, and a getter disposed between the core material and the envelope material, the getter located relatively more adjacent to the outer case than the inner case.

In accordance with another aspect of this specification, there is provided a vacuum insulation panel including a core material, an envelope material to seal the core material, a temperature sensor disposed inside the envelope material, and a transmitting/receiving unit to transmit values measured by the temperature sensor to the exterior.

Advantageous Effects of Invention

In accordance with the aspects of the detailed description, a core material having a bending groove may be sealed within an envelope material such that the envelope material can be evenly closely adhered even onto the bending groove. Accordingly, wrinkles or damages on the envelopment material, which may be caused during bending of the vacuum insulation panel, can be minimized, thereby more facilitating the attachment process of the vacuum insulation panel.

In addition, the vacuum insulation panel can be changed into various shapes, so it can be attached in an appropriate shape for the inner structure of a refrigerator main body, thereby enhancing an insulation performance of the refrigerator and thus reducing power consumption.

A getter can be located adjacent to an outer case of the refrigerator main body, so as to be run under a high temperature atmosphere and accordingly maximize its performance.

An insulation performance measuring unit may be employed in the vacuum insulation panel and measured results can be forwarded to the outside of the refrigerator through a wired or wireless communication, which allows a defect, which may be generated during attachment of the vacuum insulation panel, to be determined without disassembling the refrigerator.

MODE FOR THE INVENTION

Embodiments of a vacuum insulation material according to this specification will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

Figure 1:
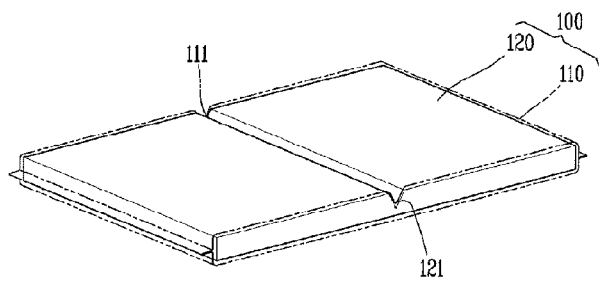
FIG. 1 is a perspective view showing a vacuum insulation panel in accordance with a first exemplary embodiment.
Figure 2:
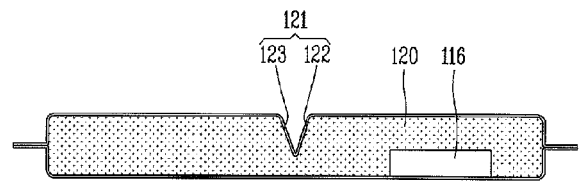
FIG. 2 is a sectional view showing a core material of the first exemplary embodiment.
Figure 3:
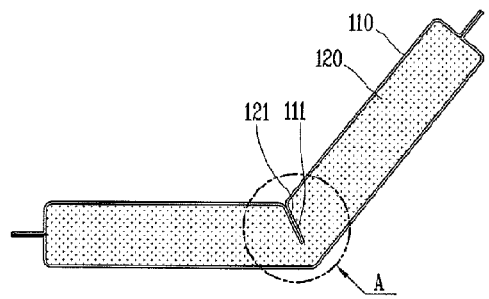
FIG. 3 is a sectional view showing a bent state of the first exemplary embodiment.
Figure 4:
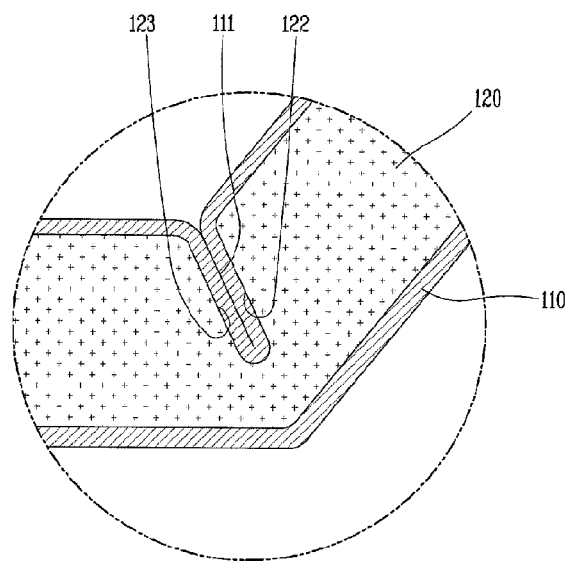
FIG. 4 is an enlarged view of a part A of FIG. 3.

FIG. 1 is a perspective view showing a vacuum insulation panel in accordance with a first exemplary embodiment, FIG. 2 is a sectional view showing a core material of the first exemplary embodiment, FIG. 3 is a sectional view showing a bent state of the first exemplary embodiment, and FIG. 4 is an enlarged view of a part A of FIG. 3.

A vacuum insulation material 100 according to a first exemplary embodiment may include an envelope material 110 having a gas blocking property and defining a predetermined decompressed space, and a core material 120 accommodated in the envelope material 110. The envelope material 110 may be sealed with the core material 120 accommodated therein. The decompressed space may be maintained at low pressure close to a vacuum for an insulation performance. Hence, the envelope material 110 should be able to block an introduction of external gas. To this end, the envelope material 110 may have a plurality of films stacked (laminated) one another. The envelope material 110 may be decompressed and sealed after accommodating the core material 120 in the decompressed space. In general, the envelope material 110 has a shape similar to an envelope having one side open. The core material 120 is injected into the decompressed space of the envelope material 110 through the opening, and upper and lower films of the envelope material 110 may be heat-welded, thereby being sealed.

The envelope material 110 may have a plurality of films stacked one another. In detail, the plurality of films stacked may include a heat-blocking layer as the lowermost layer contacting the core material 120, and an aluminum foil, a protection layer and an aluminum thin film sequentially stacked on the heat-blocking layer.

A getter 116 may be disposed inside the envelope material 110 to absorb remnant gas components and external gas components introduced from the outside to the inside of the envelope material 110. The getter 116 may be a moisture absorbent and made of CaO and zeolite. Also, the getter 116 may include BaLi, CoO, BaO, CaO and the like, for absorbing various types of gases, which may be generated from the core material 120.

The getter 116 may be defined to have a shape similar to a specific block or a rectangular parallelepiped. The getter 116 may be formed by being coated on an inner surface of the envelope material 110 or a surface of the core material 120.

The core material 120 may be formed in a shape of flat panel using glass fiber or silica. However, in some cases, the core material 120 may contain at least one of silicon dioxide ($SiO_2$), titanium dioxide ($TiO_2$) or aluminum oxide (alumina, $Al_2O_3$), or one of aerogel or fumed silica. The core material 120 will be described later.

A bending groove 121 with a predetermined depth may be formed at at least one of both surfaces of the core material 120. The bending groove 121 may be bent easily without damage on the envelope material 110 according to the shape of a complete product, such as a refrigerator, upon assembling the vacuum insulation panel 100 in the complete product.

The bending groove 121, as shown in FIG. 2, may have a first incline surface 122 and a second incline surface 123, which join at a wedged sectional shape, namely, the bent portion. The first incline surface 122 and the second incline surface 123 may be linearly symmetrical to each other with respect to a direction (in a longitudinal direction in FIG. 2) that the first and second incline surfaces 122 and 123 are parallel to a thickness direction of the core material 120. Here, the first and second incline surfaces 122 and 123 may linearly extend to form a predetermined angle with respect to each other.

Accordingly, referring to FIG. 1, FIG. 3 and FIG. 4, the envelope material 110 may include an envelope groove 111 to correspond to the bending groove 121 of the core material 120. That is, the envelope groove 111 may be formed such that the envelope material 110 can be overlaid between the first and second incline surfaces 122 and 123, which define the bending groove 121, when the core material 120 is bent. The envelope groove 111 may be formed such that its inner surface can be closely adhered to the first and second incline surfaces 122 and 123 defining the bending groove 121 when decompressing the inside of the envelope material 110.

Figure 5:
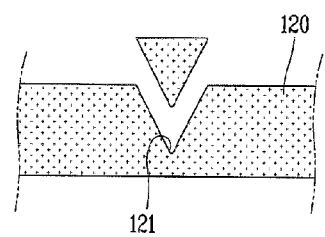
FIGS. 5 and 6 are sectional views schematically showing a process of forming a bending groove in the first exemplary embodiment.
Figure 6:
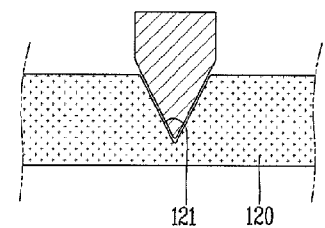

The bending groove 121 of the core material 120 may be formed in a cutting manner using a cutting tool like a water jet as shown in FIG. 5, or a decompressing manner using a decompressing tool such as a metal tip as shown in FIG. 6.

With the configuration of the vacuum insulation panel, after forming the bending groove 121 at the core material 120, as the surface of the core material 120 is covered with the envelope material 110, the core material 120 can be easily bent when bending the vacuum insulation panel 100 in correspondence with the shape of a portion of a target product where the vacuum insulation panel 100 is attached. Accordingly, the envelope material 110 can be prevented from being damaged or wrinkled at the bent portion when the core material 120 is bent.

That is, after forming the bending groove 122 at the surface of the core material 120, the surface of the core material 120 is covered with the envelope material 110. The inside of the envelope material 110 is then decompressed to be closely adhered onto the surface of the core material 120, thereby completely manufacturing the vacuum insulation panel 100 according to the first exemplary embodiment.

According to the first exemplary embodiment, a groove is previously formed at a bent portion and the envelope material is allowed to be closely adhered onto the surface of the groove, so as to prevent wrinkling or damages of the envelope material, which may be caused due to being pushed out when the vacuum insulation panel 100 is bent into a predetermined shape. Especially, when the surface of the vacuum insulation panel is uneven, the vacuum insulation panel may not be completely adhered onto the inner surface of a wall of a refrigerator when being attached thereto and this state may cause the insulation performance to be deteriorated. On the contrary, the generation of wrinkles in response to the bending may be prevented in the first exemplary embodiment and accordingly the lowering of the insulation performance due to the defective attachment can be avoided.

Figure 7:
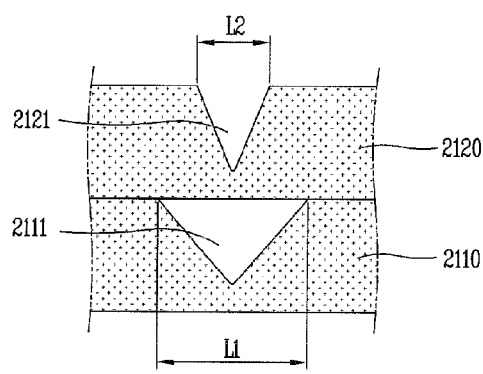
FIG. 7 is a sectional view showing a variation of the first exemplary embodiment.

In the meantime, the core material 120 may be a single layer as shown in FIG. 2, but alternatively, may be formed by plural layers as shown in FIG. 7. In this variation, a first core material 2110 and a second core material 2120 may have bending grooves 2111 and 2121, respectively, each formed at one surface, namely, in a bent direction. Each of the bending grooves 2111 and 2121 may have an angle getting narrower toward the bent direction and a sectional width L1, L2 getting smaller (about ½) toward the bent direction. This structure may be preferable in the aspect that the bending grooves 2111 and 2121 can be adhered to each other when the double-layered core materials 2110 and 2120 are bent at once. Even in this variation, the operation effects of the vacuum insulation panel are the same as those of the previous embodiment, so detailed description thereof will be omitted.

Figure 8:
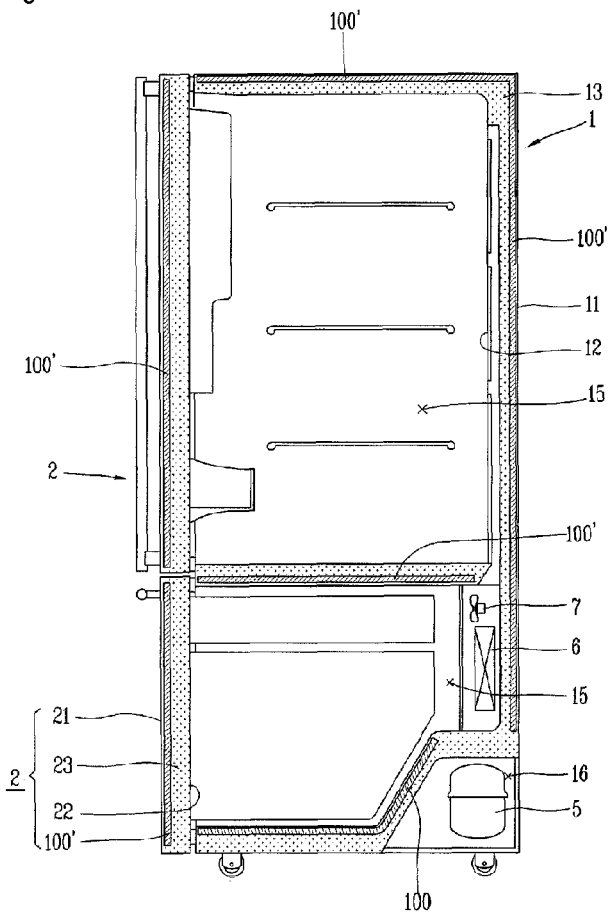
FIG. 8 is a sectional view schematically showing a refrigerator having the first exemplary embodiment.

FIG. 8 is a sectional view schematically showing a refrigerator having the vacuum insulation panel according to the first exemplary embodiment.

As shown in FIG. 8, the refrigerator may include a refrigerator main body 1 having inner storage spaces 15, doors 2 to open or close the storage spaces 15, and a plurality of vacuum insulation panels disposed in the refrigerator main body 1 or the doors 2.

In detail, the refrigerator main body 1 may include an outer case 11 defining an outer appearance, and an inner case 12 located inside the outer case 11 with being spaced apart from the outer case 11 by an interval for interposing an insulation panel 13 so as to form the storage spaces 15 such as a freezing chamber or a refrigerating chamber.

The refrigerator main body 1 may include a refrigeration cycle for providing cold air into the storage space 15, and have a machine room 16 formed in a lower portion at the rear of the refrigerator main body 1. Some components of the refrigeration cycle such as a compressor 5 and the like may be installed inside the machine room 16. An evaporator 6 may be located at one side within the storage space 15, and a cooling fan 7 may be located at one side of the evaporator 6.

The door 2 may include a door outer plate 21 defining an outer appearance, and a door inner plate 22 disposed inside the door outer plate 21 with being spaced apart therefrom by an interval for interposing an insulation panel 23.

A portion adjacent to the machine room 16, as shown, may have a shape like the inner case being bent. In the related art, two sheets of vacuum insulation panels should be consecutively attached or one sheet of vacuum insulation panel should be attached by being bent. In this case, the insulation performance may be lowered at the joint between the vacuum insulation panels, and also the vacuum insulation panel may be destroyed or contain a defect due to being wrinkled when bent.

However, as shown, a vacuum insulation panel 100' having the general form of a flat panel may be used for the door or rear surface of a refrigerator where any bent portion is not present and a vacuum insulation panel 100 having the shape shown in the exemplary embodiment may be used when the bent portion, such as the machine room, is present, thereby facilitating attachment of the vacuum insulation panels and improving the insulation performance of the refrigerator.

Figure 9:
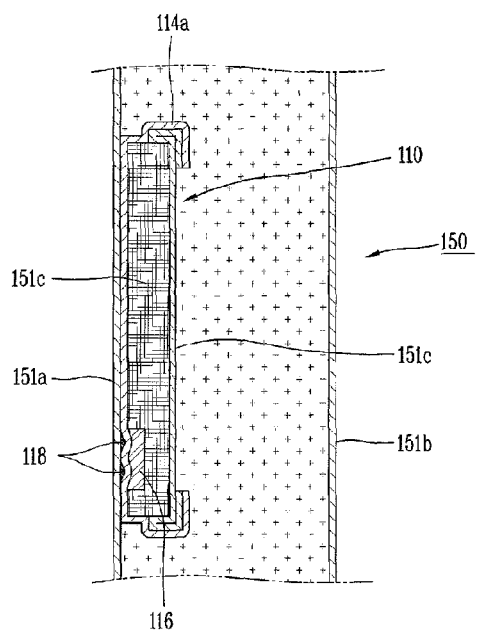
FIG. 9 is a sectional view and a perspective view showing a part of FIG. 8 in an enlarged state.

In the meantime, referring to FIG. 9, the getter 116 may be disposed at a position eccentric to one side based on a central line of the vacuum insulation panel 100', more especially, disposed to contact the inner surface of the envelope material 110. The other surface of the envelope material 110, which the getter 116 contact, may contact the outer case 11 of the main body 1.

In general, the getter 116 may exhibit a difference in view of moisture absorption properties of components that it contains depending on an internal temperature. Especially, as mentioned above, when the getter 116 has zeolite or CaO as a main component, its moisture absorption property may be improved as the temperature is close to room temperature or higher than the room temperature. However, in regard of the characteristic of the refrigerator, since the inner space of the refrigerator is maintained at temperature lower than 5 to 10° C., the performance of the getter may be in danger of being lowered.

Hence, in accordance with the exemplary embodiment, the getter 116 is allowed to contact the outer case whose temperature is relatively high, so as to be placed in an environment favorable for improvement of moisture absorption. That is, the outer case 11 may be made of a metal having high heat conductivity and present in an external environment maintained at a relatively high temperature, so the outer case 11 is maintained at a higher temperature than the inside of the refrigerator. Consequently, since the getter 116 is located between the high temperature outer case 11 and the envelope material 110, the getter 116 may be subject to an environment of higher temperature than the related art. Hence, the performance of the getter 116 can be maximized.

Here, the getter 116 may not be good in view of a surface smoothness, unlike the core material, and accordingly, generate a gap from the outer case. When such gap is generated, a foaming liquid may be permeated into the gap during the manufacturing process. Since the permeated foaming liquid is expanded during the foaming process, the vacuum insulation panel may be separated from the outer case. Therefore, as shown in FIG. 9, prior to attaching the vacuum insulation panel onto the outer case, a heat transfer material 118 may be coated on the outer case or the envelope material of the vacuum insulation panel. The coated heat transfer material 118 may fill up the gap generated between the envelope material and the outer case due to due to a defective surface, which may be generated outside the getter 116, thereby preventing the occurrence of the aforesaid problems.

Besides, another example that a portion where the getter 116 is located is formed to be thicker than other portions so as to increase rigidity may also be considered, instead of making the envelope material have a uniform thickness. Also, the getter may be applicable to the vacuum insulation panel 100 having the bending groove as well as the vacuum insulation panel 100' having the shape of flat panel.

The core material may have a shape obtained by pressing glass fibers, as aforesaid, but it may not be limited to the shape but changeable into various shapes. That is, if the core material is formed by using both glass fiber and silica other than using only one of them, a material cost of the core material can be reduced and long-term reliability of the core material can be enhanced. Also, the performance of the getter can be assisted, or if necessary, the getter may not be needed.

Figure 10:
FIGS. 10 to 16 are sectional views showing variations of a core material disposed in the first exemplary embodiment.
Figure 11:
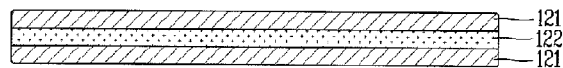

In detail, referring to FIG. 10, the core material 120 may be implemented with a double-layered structure having a glass fiber layer 121 and a silica layer 122. In some cases, the core material 120 may be formed with multiple layers more than three layers. In this case, as shown in FIG. 11, the three or more layers may be aligned such that one of the glass fiber layer 121 and the silica layer 122 may be located at both outer sides, or the glass fiber layer 121 and the silica layer 122 may be located at both outer sides, respectively.

Figure 12:
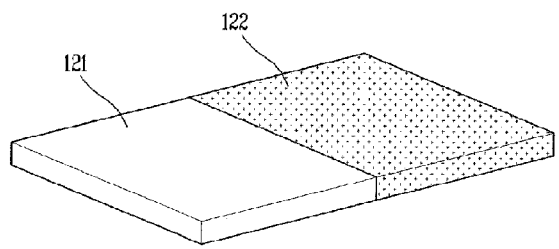
Figure 13:
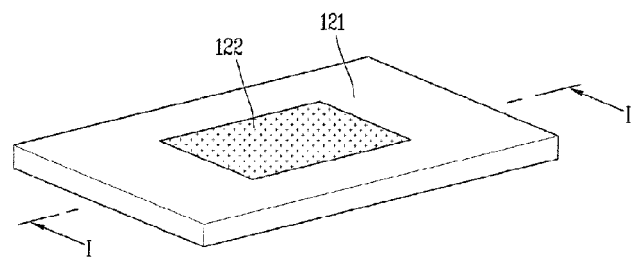

Alternatively, as shown in FIG. 12, those layers may be aligned such that the glass fiber layer 121 and the silica layer 122 can be located in parallel to each other on the same planar surface. Even in this case, the glass fiber layer 121 and the silica layer 122 may be formed to have the same area, or formed to have different areas according to the purpose to be applied to a product, such as long-term reliability, insulation performance, material cost and the like.

Figure 14:
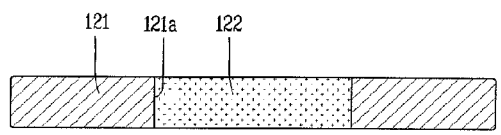
Figure 15:
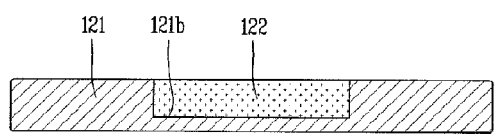
Figure 16:
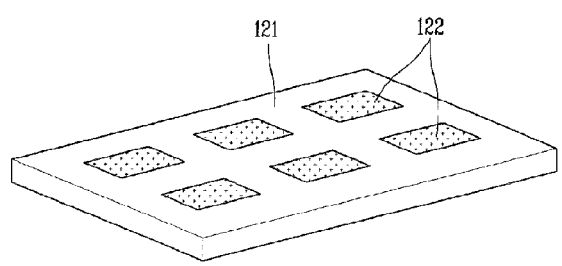

Also, referring to FIGS. 13 to 16, the glass fiber layer 121 and the silica layer 122 may be formed such that one member is inserted in the other member. Referring to FIG. 14, the core material 120 may be implemented by forming an insertion hole 121a at the center of the glass fiber layer 121 and inserting the silica layer 122 into the insertion hole 121a. Or, referring to FIG. 15, the core material 120 may be implemented by forming an insertion groove 121b having a predetermined depth at the glass fiber layer 121 and inserting the silica layer 122 into the insertion groove 121b. Referring to FIG. 16, the core material 120 may be implemented by forming a plurality of insertion holes or insertion grooves at the glass fiber layer 121 and inserting the silica layer 122 into each of the insertion holes or insertion grooves.

With the configuration of the vacuum insulation panel 100 having the core material 120, which is accommodated inside the envelope material 110 and employs both the glass fiber layer 121 and the silica layer 122, a material cost can be reduced as compared with the core material manufactured by using only silica and long-term reliability can be improved as compared with the core material manufactured by using only glass fiber, which results in enhancing the insulation performance of the vacuum insulation panel. In addition, a composition ratio of the silica layer may be adjusted such that the getter can be removed and the silica layer can serve as the getter.

As aforementioned, the vacuum insulation panel is first attached onto the outer case of the refrigerator and then undergoes the foaming process of high temperature and high pressure. During the foaming process, the vacuum insulation panel may be separated from the attached position or the envelope material may be damaged. Furthermore, in order to determine whether any defect is generated in the vacuum insulation panel included in a completely foamed cabinet, a product should be destroyed. Thus, it is actually impossible to determine presence or non-presence of the defect.

Figure 17:
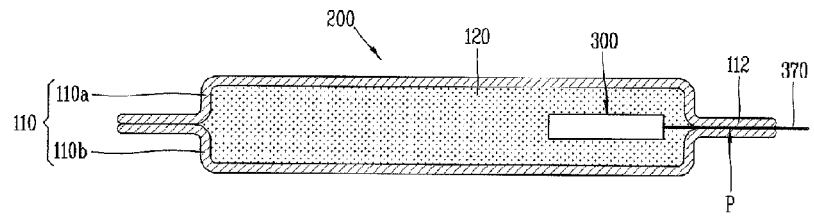
FIG. 17 is a sectional view showing a vacuum insulation panel in accordance with a second exemplary embodiment.

FIG. 17 shows a vacuum insulation panel according to a second exemplary embodiment. The vacuum insulation panel according to the second exemplary embodiment may further include an insulation performance measuring unit for determining such presence or non-presence of the defect. Meanwhile, the similar/like components to the first exemplary embodiment will have the same reference numerals, and repeated description will be omitted.

Referring to FIG. 17, the vacuum insulation panel 200 according to the second exemplary embodiment is the same as that of the first exemplary embodiment in the aspect of having the envelope material 110 and the core material 120. The envelope material 110 may seal the core material 120 in a state that an upper film 110a and a lower film 110b are bonded to each other. A heat-welded portion 112 may be disposed at one side of the envelope material 110. The heat-welded portion 112 may function as an opening for injecting the core material 120 into the envelope material 110, and thermally welded after injection of the core material 120, thereby sealing the core material 120.

An insulation performance measuring unit 300 may be disposed inside the core material 120. Also, an antenna 370 connected to the insulation performance measuring unit 300 via the heat-welded portion 112 may be externally exposed. The antenna 370 may be thermally welded together with the heat-welded portion 112, thereby being stably fixed.

Figure 18:
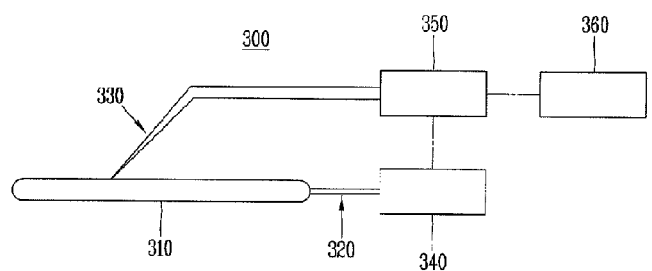
FIG. 18 is a block diagram showing an insulation performance measuring unit included in the second exemplary embodiment.
Figure 19:
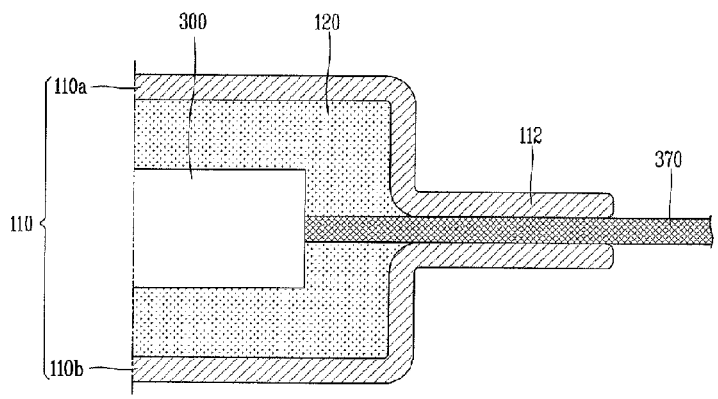
FIG. 19 is a sectional view showing a part of FIG. 17 in an enlarged state.

The insulation performance measuring unit 300, referring to FIG. 18, may include a heating body 310 disposed inside the core material 120, a heater 320 to heat up the heating body 310, and a temperature sensor 330 to measure the temperature of the heating object 310. The insulation performance measuring unit 300 may further include a first controller 350 to run the heater 320 and process a signal forwarded from the temperature sensor 330, and a power supply unit 340 to supply power to the heater 320, the temperature sensor 330 and the first controller 350.

Meanwhile, a Radio Frequency Identification (RFID) 360 may be connected to the first controller 350 to transmit and receive signals to and from an external measuring device, and the transmit/receive antenna 370 for assisting the operation of the RFID 360 may be connected to the RFID 360. Typically, the envelope material 110 includes a thin metal film or metalized layer, which makes it difficult to transmit a signal of the RFID to the outside. Hence, the antenna 370 is exposed outside the envelope material 110, thereby facilitating the signal transmission.

The heating body 310 may have a random shape, but especially, have a shape of a thin plate, for example, a shape of coin made of a metal. The heater 320 may be a heating coil inserted in the core material 120. The heater 320 may be electrically connected to the heating body 310. The heater 320 may be disposed to surround an outer circumference of the heating body 310.

The heater 320 may be electrically connected to the power supply unit 340, and receive power from the power supply unit 340 to heat up the heating body 310. Here, the power supply unit 340 may also be inserted in the core material 120.

The temperature sensor 330 may be inserted in the core material 120. The temperature sensor 330 may be a sensor, similar to a thermocouple, for measuring temperature. The temperature sensor 330 may contact the heating body 310 to measure a temperature value of the heating body 310.

The first controller 350 may be inserted in the core material 120 and electrically connected to the power supply unit 340 and the temperature sensor 350. The first controller 350 may control the power supply unit 340 to apply power to the heater 320. The first controller 350 may receive the measured temperature value from the temperature sensor 330. The first controller 350 may have a preset temperature change range used as a reference value. Here, the temperature change range may be variably set by use of an external input unit.

The controller 350 may receive the measured temperature value, determine whether a temperature change according to the measured temperature value belongs to the preset temperature change range, and determine presence or non-presence of a defect based on the determination result. Here, the preset temperature change range may be set based upon a temperature change of a good product.

The RFID 360 may store information about the presence or non-presence of the defect, and the information may be wirelessly communicated with an adjacent RFID reader (not shown) through the transmit/receive antenna 370. Therefore, the RFID 360 and the RFID reader may communicate with each other using predetermined frequency bands, and accordingly, the information can be recognized in the RFID reader.

Hereinafter, description will be given of an operation of the second exemplary embodiment.

A driving signal is transmitted from a particular external device (not shown), such as an RFID reader, to the first controller 350 through the transmit/receive antenna 370.

The first controller 350 runs the power supply unit 340 to apply power to the heater 320. The heater 320 accordingly emits heat to heat up the heating body 310 connected thereto. Then, the heating body 310 as the metal coin is heated up in an inserted state in the core material 120. Here, the temperature sensor 330 measures a temperature value of the heated heating body 310 to forward to the first controller 350.

Here, when the vacuum insulation panel having the core material 120 and the envelope material 110 exhibits a normal insulation performance, the heating temperature of the heating body 310 is increased more rapidly than an abnormal insulation performance of the vacuum insulation panel. That is, since heat loss to the outside of the panel is less when the vacuum insulation panel exhibits the normal insulation performance, the temperature of the heating body 310 is rapidly increased. On the contrary, the insulation performance is lowered when the vacuum insulation panel is defective. Accordingly, a heat transfer to the outside is increased, resulting a relatively slow increase in the temperature.

In the meantime, the first controller 350 determines whether a temperature change based on the measured temperature values received for a predetermined time is included in the preset temperature change range. Here, when the temperature change is included in the preset temperature change range, the vacuum insulation panel is determined to be normal. When the temperature change is not included in the preset temperature change range, the vacuum insulation panel is determined to be abnormal. The first controller 350 then transmits the determination results to a storage of the RFID 360, and the REID 360 stores the result as information. When an external RFID reader approaches the RFID 360, the information stored in the RFID 360 is transmitted to the RFID reader.

Figure 20:
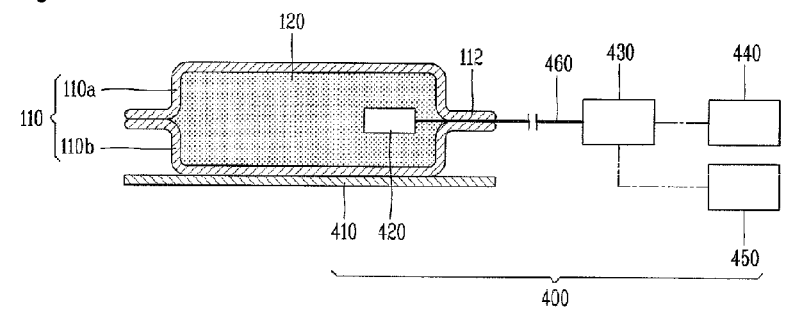
FIG. 20 is a sectional view showing another example of the insulation performance measuring unit.

The insulation performance measuring unit may not be limited to the shown structure, but a structure of having a heating source at the outside of the vacuum insulation panel may also be considered. FIGS. 20 to 23 show the structures having such heating source. Referring to FIG. 20, only a temperature sensor 420 is inserted in the core material 120, and a lead wire 460 connected to the temperature sensor 420 extends to the outside of the vacuum insulation panel through the heat-welded portion 112. A thermistor whose resistance value changes according to temperature may be used as the temperature sensor 420.

The lead wire 460 may be connected to a second controller 430. The second controller 430 may be connected to a display 440 and an alarm generator 450 to display measurement results to the outside. Here, the insulation performance measuring unit 400 may include a heating plate 410 as the heating source.

Hence, the second controller 430 may control the temperature sensor 420 to measure the temperature changes within the core material 120 due to the heating plate 410, and determine presence or non-presence of a defect of the vacuum insulation panel based on the measured temperature changes.

Figure 21:
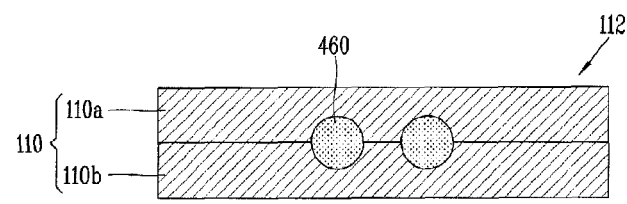
FIG. 21 is a sectional view showing a part of the example shown in FIG. 20 in an enlarged state.
Figure 22:
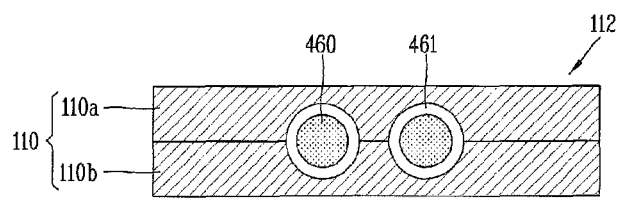
FIG. 22 is a sectional view showing an enlarged part of the variation of the example shown in FIG. 20.

The lead wire 460 may be welded together with the heat-welded portion 112, as aforementioned (see FIG. 21). Here, for enhancement of a bonding strength, a coating layer 461 made of the same material as the heat-welded layer 112 disposed at the envelope material may further be included on the surface of the lead wire 460 (See FIG. 22). As one example, the coating layer 461 may be made of LLDPE. In order to facilitate connection to the lead wire 460, a case where a connector is further provided at an end of the lead wire may be considered as well.

The invention claimed is:

1. A vacuum insulation panel comprising:
    a core material having a bending groove at at least one surface; and
    an envelope material to cover an outer surface of the core material;
    wherein the core material having the bending groove is formed by stacking a first core material having a first bending groove and a second core material having a second bending groove such that each of the bending grooves of the first and second core materials is disposed toward a bent direction, and
    wherein the bending grooves are formed such that sectional widths thereof get narrower along the bent direction.

2. The panel of claim 1, wherein a width of each bending groove is increased toward the outside of the core material.

3. The panel of claim 1, wherein each bending groove comprises a first incline surface and a second incline surface facing each other.

4. The panel of claim 3, wherein the first incline surface and the second incline surface are symmetric to a surface parallel to a thickness direction of the core material.

5. The panel of claim 4, wherein the first incline surface and the second incline surface are planar surfaces.

6. The panel of claim 3, wherein the envelope material covers the faces of the first incline surface and the second incline surface of the second core material, and overlaid between the first incline surface and the second incline surface when the core material is bent.

7. The panel of claim 1, wherein the core material is formed by stacking a silica layer made of silica and a glass fiber layer made of glass fiber.

8. The panel of claim 7, wherein the silica layer is disposed to come in contact with an inner surface of the envelope material.

9. A refrigerator comprising:
a refrigerator main body having an outer case externally exposed and an inner case disposed inside the outer case;
a foam disposed between the outer case and the inner case; and
a vacuum insulation panel fixed to the inner surface of the outer case,
wherein the vacuum insulation panel comprises:
a core material having a bending groove at at least one surface;
an envelope material to cover an outer surface of the core material; and
a getter disposed between the core material and the envelope material, the getter located relatively more adjacent to the outer case than the inner case,
wherein the core material is formed by stacking a first core material having a bending groove and a second core material having a bending groove such that each of the bending grooves of the first and second core materials is disposed toward a bent direction, and
wherein the bending grooves are formed such that sectional widths thereof get narrower along the bent direction.

10. The refrigerator of claim 9, wherein an outer surface of at least part of the envelope material contacts the outer case, and an inner surface of the envelope material contacts the getter.

11. The refrigerator of claim 9, further comprising a heat transfer material filling a gap generated between the envelope material and the outer case due to a defective surface.

\* \* \* \* \*